(12) United States Patent
Chukwu

(10) Patent No.: US 11,750,919 B2
(45) Date of Patent: Sep. 5, 2023

(54) AUTOMATIC PICTURE AND TEXT ALERTING CAMERA, WITH INBUILT SMOKE AND MOTION DETECTORS

(76) Inventor: Ahamefula Chukwu, Houston, TX (US)

(*) Notice: Subject to any disclaimer, the term of this patent is extended or adjusted under 35 U.S.C. 154(b) by 1340 days.

(21) Appl. No.: 11/811,510

(22) Filed: Jun. 11, 2007

(65) Prior Publication Data
US 2008/0122929 A1 May 29, 2008

Related U.S. Application Data

(63) Continuation-in-part of application No. 11/606,239, filed on Nov. 29, 2006, now abandoned.

(51) Int. Cl.
*H04N 23/661* (2023.01)
*G08B 17/10* (2006.01)
(Continued)

(52) U.S. Cl.
CPC ..... *H04N 23/661* (2023.01); *G08B 13/19689* (2013.01); *G08B 13/19697* (2013.01); *G08B 17/10* (2013.01); *G08B 17/12* (2013.01); *H04L 67/12* (2013.01); *H04L 67/535* (2022.05); *H04N 1/00307* (2013.01); *H04N 1/00912* (2013.01); *H04N 1/32765* (2013.01); *H04N 7/18* (2013.01); *H04N 7/183* (2013.01); *H04N 7/188* (2013.01); *H04N 23/633* (2023.01); *H04N 23/66* (2023.01); *H04N 2101/00* (2013.01); *H04N 2201/0084* (2013.01); *H04N 2201/3264* (2013.01); *H04N 2201/3266* (2013.01); *H04N 2201/3278* (2013.01)

(58) Field of Classification Search
CPC .............. G08B 17/10; G08B 13/19697; G08B 13/19689; G08B 17/12; H04N 5/232939; H04N 1/00912; H04N 1/00307; H04N 1/32765; H04N 5/23203; H04N 5/23206; H04N 7/18; H04N 7/183; H04N 7/188; H04N 23/633; H04N 23/66; H04N 23/661; H04N 2101/00; H04N 2201/0084; H04N 2201/3264; H04N 2201/3266; H04N 2201/3278; H04L 67/12; H04L 67/535
USPC .................................... 348/143, 148
See application file for complete search history.

(56) References Cited

U.S. PATENT DOCUMENTS

| 5,428,388 A * | 6/1995 | von Bauer | H04N 7/186 |
| | | | 348/155 |
| 6,456,322 B1 * | 9/2002 | Marinacci | G08B 13/19634 |
| | | | 348/156 |

(Continued)

OTHER PUBLICATIONS

Hadzima, Joseph, "Did Amazon Understand the Scope of SkyBell Patents WhenBuying Ring?", Sep. 21, 2019, https://info.ipvisioninc.com/blog/did-amazon-understand-the-scope-of-skybell-patents-when-buying-ring (Year: 2019).*

(Continued)

*Primary Examiner* — Ramy M Osman

(57) ABSTRACT

The present invention is a security camera that is fully equipped with an inbuilt smoke and motion detectors and with a special remote control to program the security camera. Furthermore, the security camera is specially designed to be set by a user to automatically capture and send a still picture or motion picture with audio or video message to a mobile phone when the smoke detector or motion detector is activated.

1 Claim, 14 Drawing Sheets

(51) Int. Cl.
  *H04N 1/00* (2006.01)
  *G08B 13/196* (2006.01)
  *H04N 1/327* (2006.01)
  *H04N 7/18* (2006.01)
  *G08B 17/12* (2006.01)
  *H04N 23/66* (2023.01)
  *H04N 23/63* (2023.01)
  *H04L 67/12* (2022.01)
  *H04L 67/50* (2022.01)
  *H04N 101/00* (2006.01)

(56) References Cited

U.S. PATENT DOCUMENTS

| | | | |
|---|---|---|---|
| 6,611,206 B2 * | 8/2003 | Eshelman et al. | 340/573.1 |
| 7,256,818 B2 * | 8/2007 | Sadok et al. | 348/143 |
| 7,304,572 B2 * | 12/2007 | Sheynman | H04L 63/0442 |
| | | | 340/539.11 |
| 7,643,056 B2 * | 1/2010 | Silsby | H04N 5/23218 |
| | | | 348/155 |
| 7,746,223 B2 * | 6/2010 | Howarter | G08B 13/1966 |
| | | | 340/506 |
| 8,154,581 B2 * | 4/2012 | Carter | H04N 7/185 |
| | | | 348/14.06 |
| 8,374,586 B2 * | 2/2013 | Bentkovski | H04N 5/23206 |
| | | | 455/414.1 |
| 2003/0179096 A1 * | 9/2003 | Hanan | G08B 17/10 |
| | | | 340/628 |
| 2004/0135686 A1 * | 7/2004 | Parker | G08B 13/19684 |
| | | | 340/540 |
| 2004/0204054 A1 * | 10/2004 | Lee | H04L 12/66 |
| | | | 455/556.1 |
| 2005/0179539 A1 * | 8/2005 | Hill | G08B 13/19632 |
| | | | 340/539.1 |
| 2005/0262519 A1 * | 11/2005 | Luebke | G08B 13/19684 |
| | | | 719/318 |
| 2006/0139449 A1 * | 6/2006 | Cheng | H04N 7/186 |
| | | | 348/61 |
| 2006/0156361 A1 * | 7/2006 | Wang | H04N 7/186 |
| | | | 725/105 |
| 2006/0183460 A1 * | 8/2006 | Srinivasan | G08B 25/006 |
| | | | 455/410 |
| 2006/0192659 A1 * | 8/2006 | Fazio | G08B 13/19647 |
| | | | 340/426.18 |
| 2006/0203101 A1 * | 9/2006 | Silsby | H04N 5/23206 |
| | | | 348/222.1 |
| 2006/0215011 A1 * | 9/2006 | P. S. | H04M 1/66 |
| | | | 348/14.02 |
| 2007/0047641 A1 * | 3/2007 | Bellinson | H04N 7/183 |
| | | | 375/240.01 |
| 2007/0063840 A1 * | 3/2007 | Jentoft | G08B 13/19658 |
| | | | 340/541 |
| 2007/0070185 A1 * | 3/2007 | Dy | H04N 7/181 |
| | | | 348/14.03 |
| 2007/0076095 A1 * | 4/2007 | Tomaszewski | H04N 7/183 |
| | | | 348/E7.087 |
| 2007/0085674 A1 * | 4/2007 | Sharpe | G08B 13/196 |
| | | | 340/531 |
| 2007/0103542 A1 * | 5/2007 | Carter | 348/14.06 |
| 2007/0268121 A1 * | 11/2007 | Vasefi et al. | 340/506 |
| 2008/0016366 A1 * | 1/2008 | Monroe | H04L 12/2805 |
| | | | 713/182 |
| 2008/0062258 A1 * | 3/2008 | Bentkovski | G08B 13/19695 |
| | | | 348/50 |
| 2008/0111684 A1 * | 5/2008 | Zinser | H04N 7/186 |
| | | | 340/541 |
| 2008/0122929 A1 * | 5/2008 | Chukwu | G08B 13/19697 |
| | | | 348/143 |
| 2008/0124065 A1 * | 5/2008 | Chukwu | H04N 7/18 |
| | | | 396/56 |
| 2008/0136914 A1 * | 6/2008 | Carlson | H04N 7/181 |
| | | | 348/155 |
| 2008/0151056 A1 * | 6/2008 | Ahamefula | H04N 7/183 |
| | | | 348/164 |
| 2009/0167862 A1 * | 7/2009 | Jentoft | G08B 13/19695 |
| | | | 348/143 |
| 2010/0222031 A1 * | 9/2010 | Carolan | H04M 1/72415 |
| | | | 455/414.1 |

OTHER PUBLICATIONS

McCarthy, Kieren, "Who's that at Ring's door? Why, it's Skybell with a begging cup, er, patent rip-off lawsuit", Jan. 8, 2018, https://www.theregister.com/2018/01/08/ring_sued_skybell_patents/ (Year: 2018).*

McCarthy, Kieren, "Who's that at Ring's door? Why, it's Skybell with a begging cup, er, patent rip-off lawsuit (Comments)", Jan. 8, 2018, https://forums.theregister.com/forum/all/2018/01/08/ring_sued_skybell_patents/ (Year: 2018).*

Elkhunovich, Oleg, "Complaint for Patent Infringement", Jan. 5, 2018, Case 8:18-cv-00014 (Year: 2018).*

* cited by examiner

FIG.1
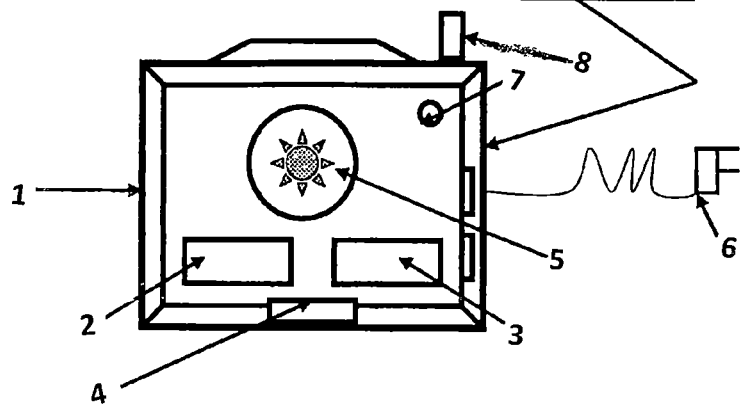
Automatic picture and text alerting camera
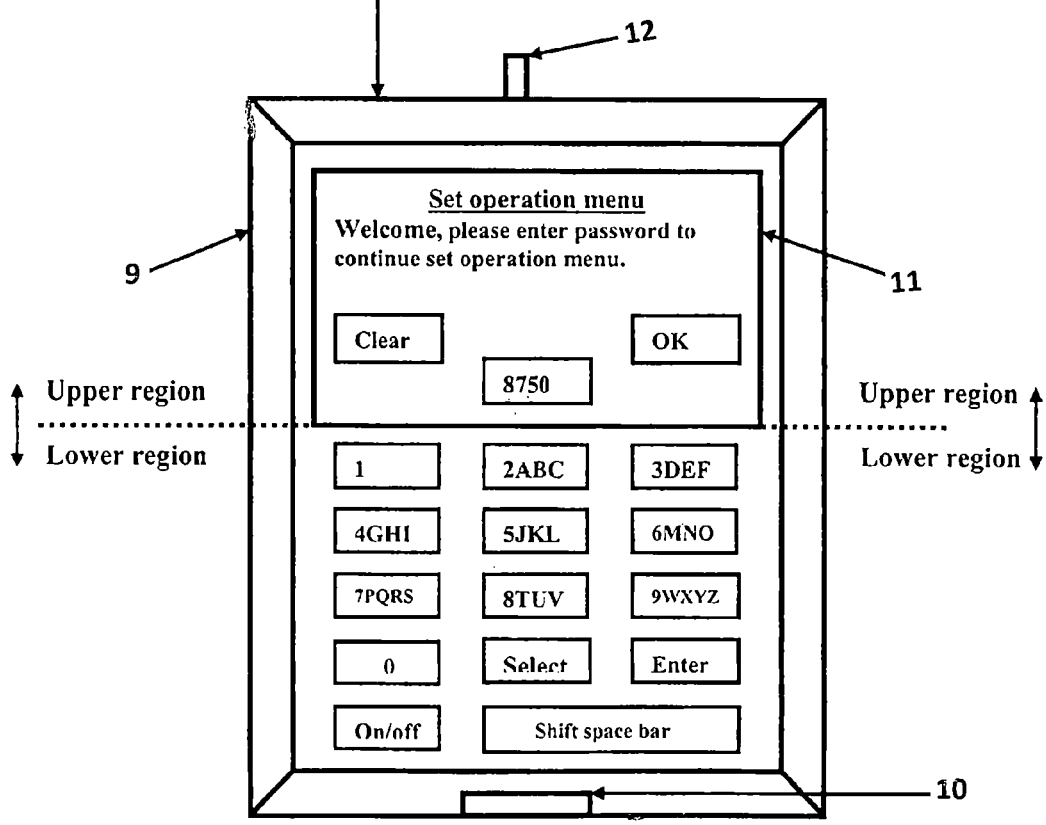
Remote control for automatic picture and text alerting camera FIG.2
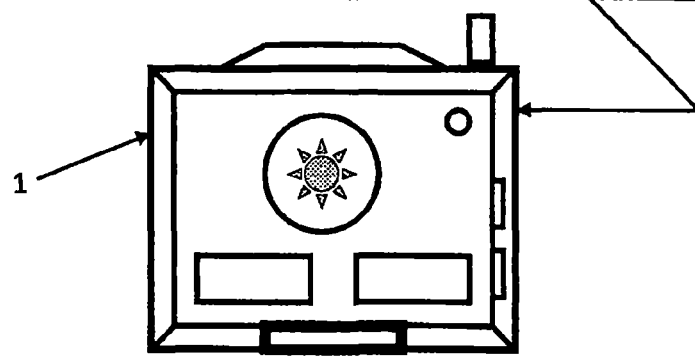
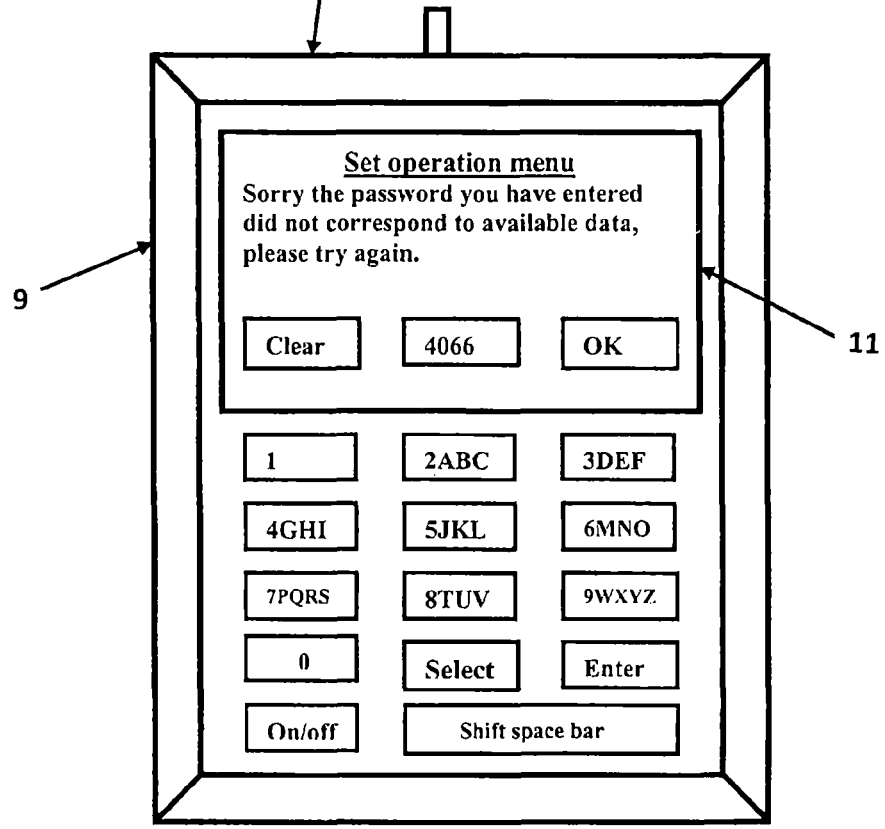

FIG.3
Automatic picture and text alerting camera
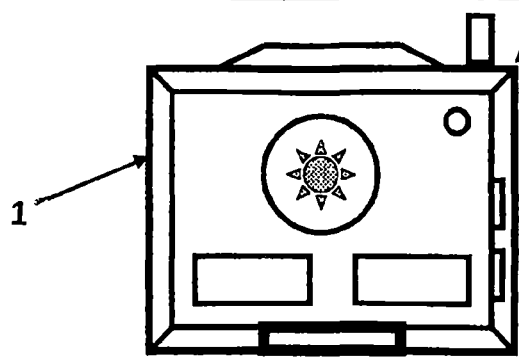
Remote control for automatic picture and text alerting camera
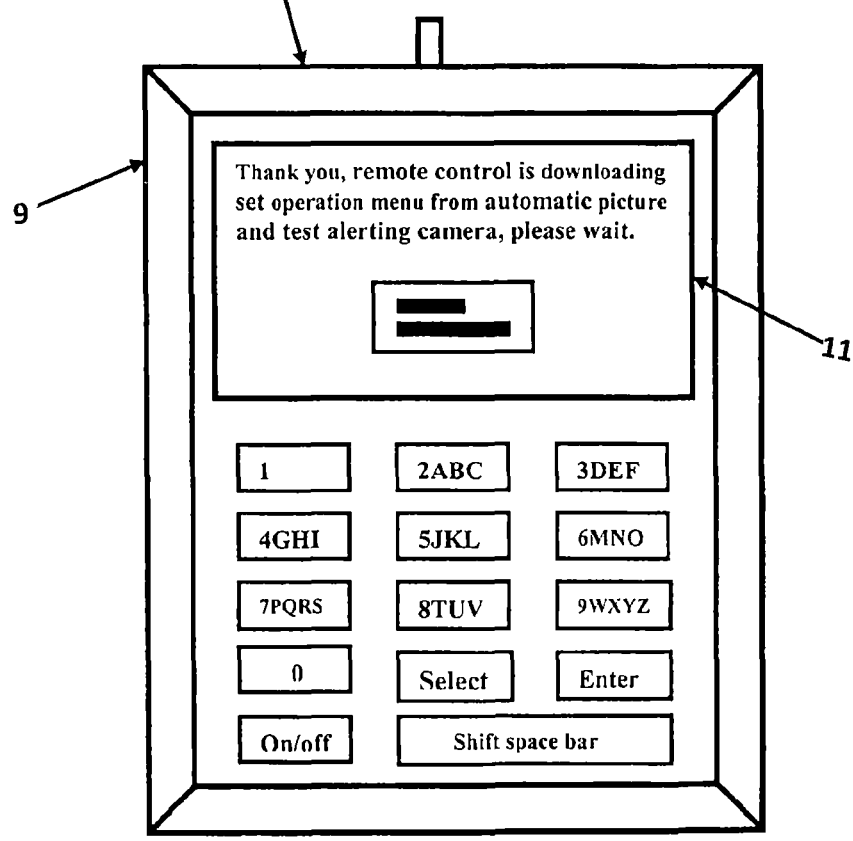

FIG.5   Automatic picture and text alerting camera
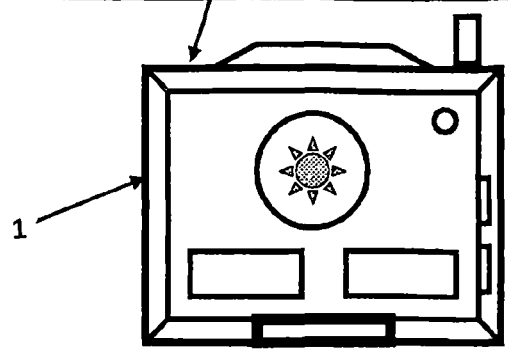
Remote control for automatic picture and text alerting camera
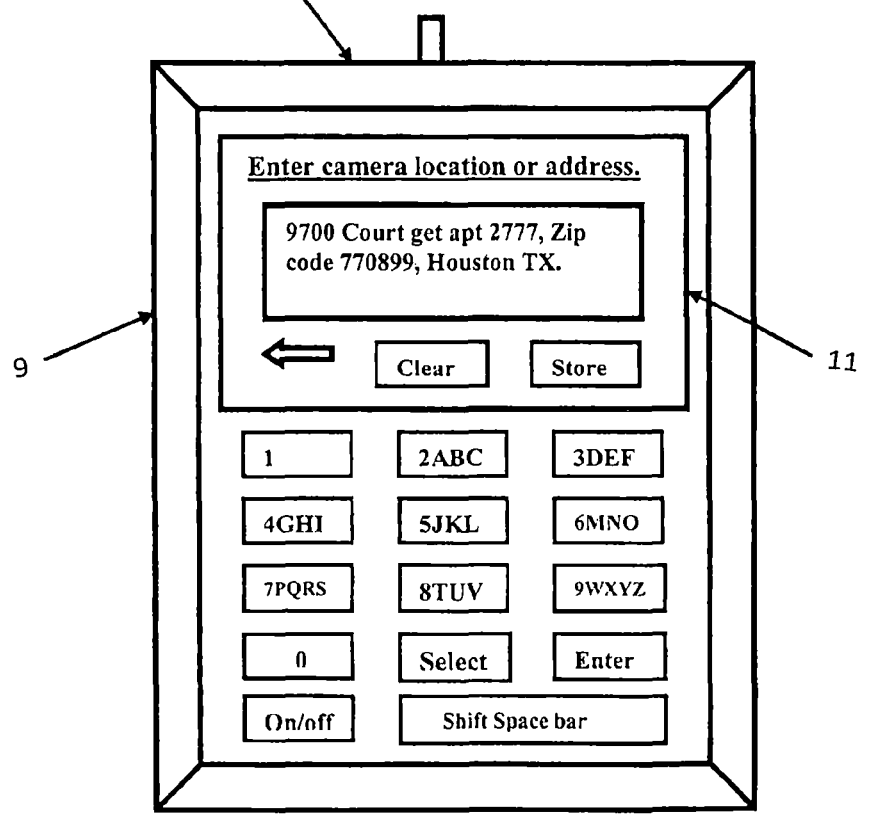

FIG.6
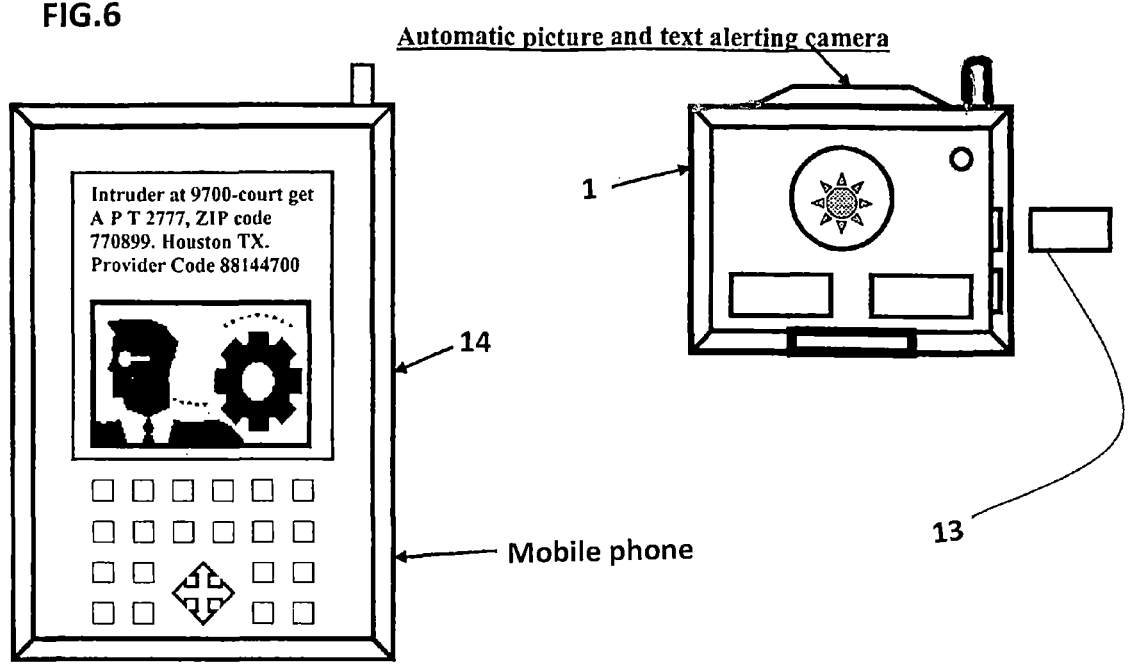
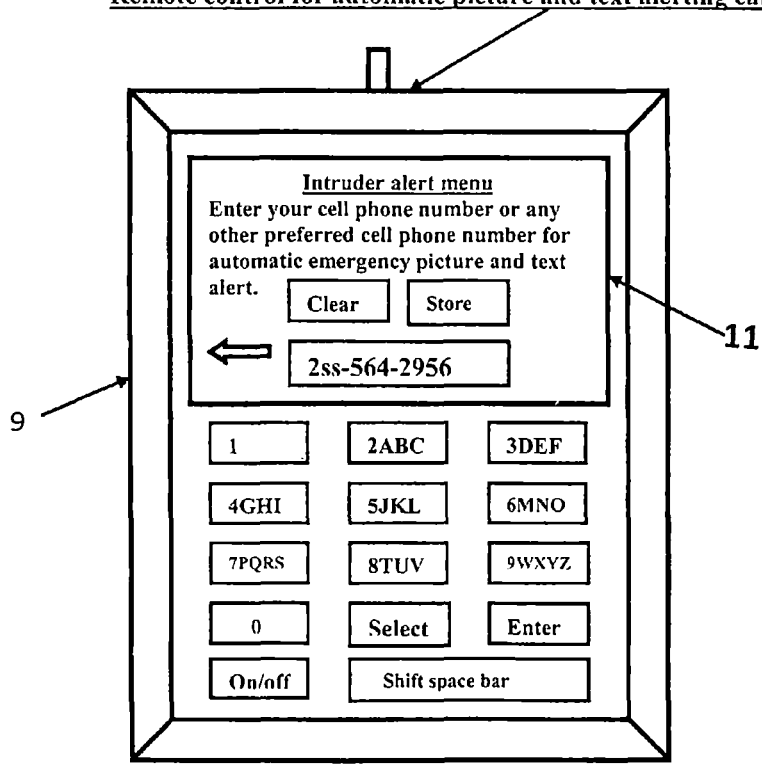

FIG.8
Automatic picture and text alerting camera
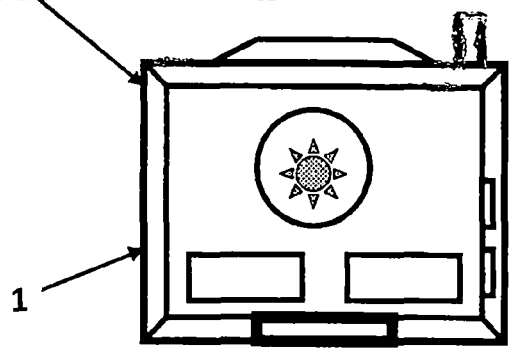
Remote control for automatic picture and text alerting camera
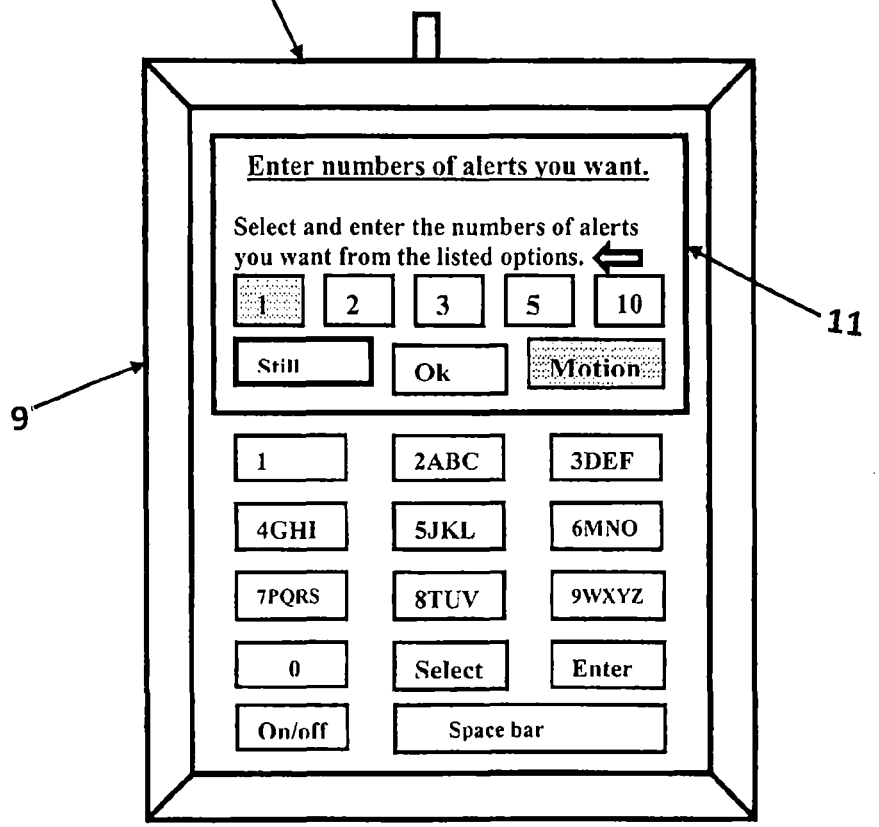

FIG.9
Automatic picture and text alerting camera
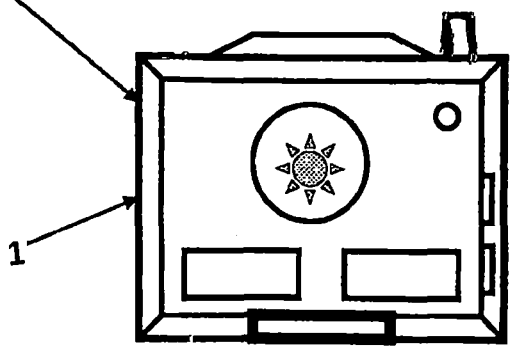
Remote control for automatic picture and text alerting camera
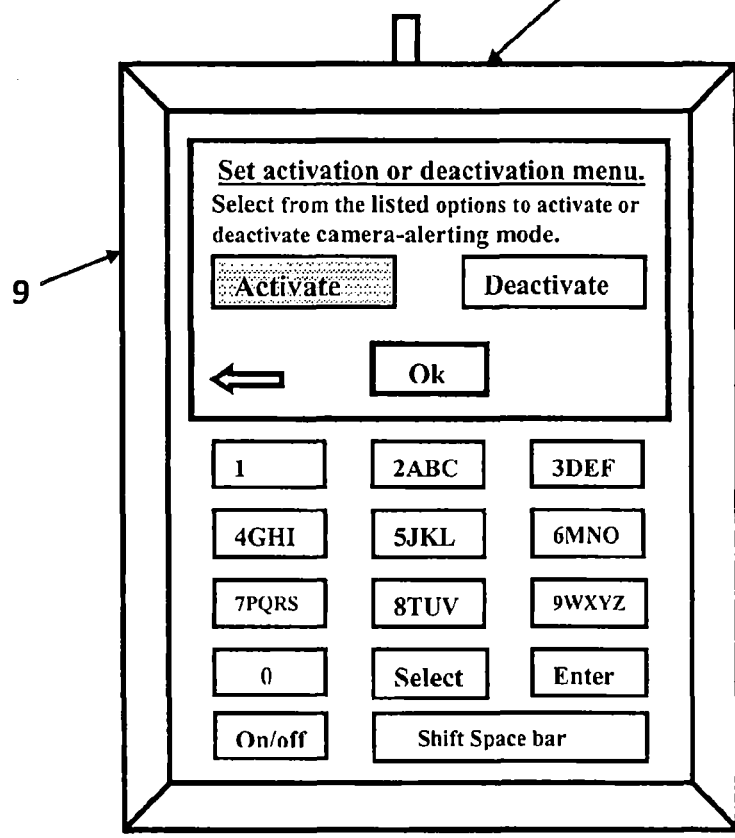

FIG.10
Automatic picture and text alerting camera
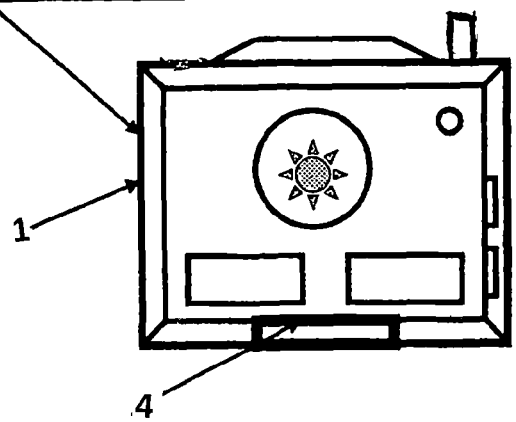
Remote control for automatic picture and text alerting camera
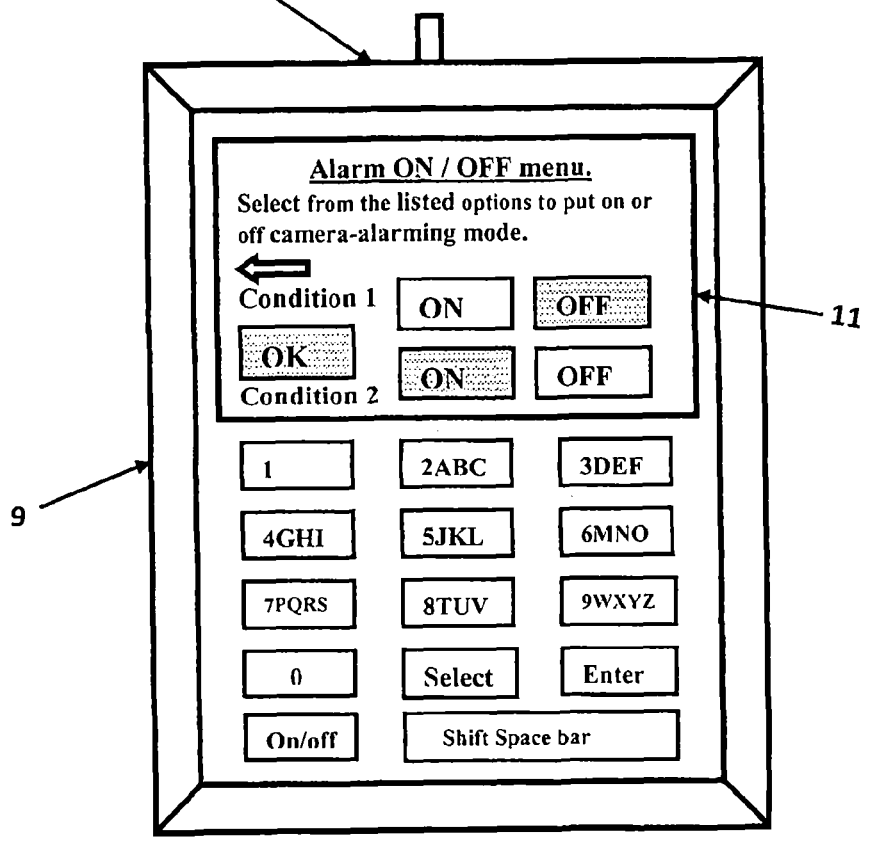

FIG.11
Automatic picture and text alerting camera
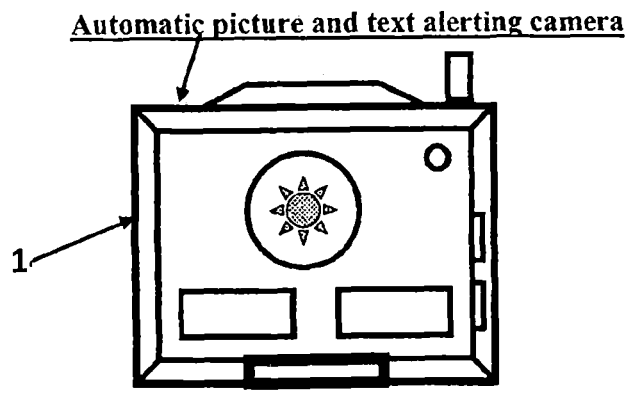
Remote control for automatic picture and text alerting camera
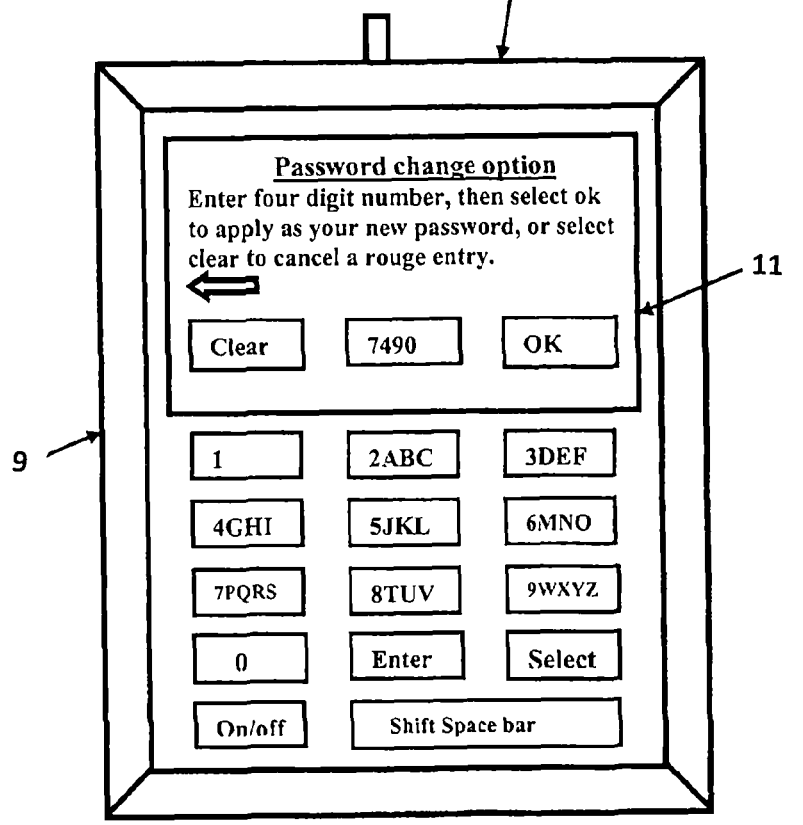

FIG.13
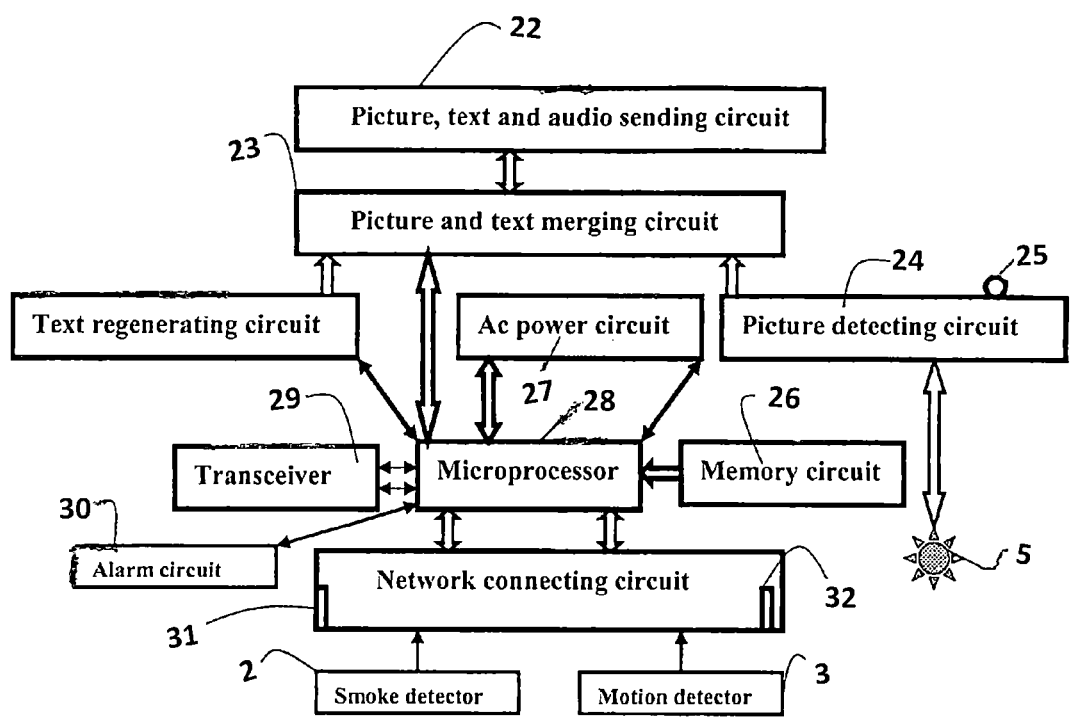
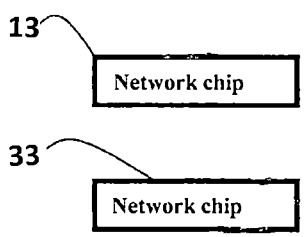

AUTOMATIC PICTURE AND TEXT ALERTING CAMERA, WITH INBUILT SMOKE AND MOTION DETECTORS

CROSS REFERENCE TO RELATED APPLICATION

This application is a continuation in part of application Ser. No. 11/606,239, filing date Nov. 29, 2006, applicant name Chukwu, Ahamefula, Art unit 2851 and the title of the invention is automatic picture and text alerting camera, with inbuilt smoke and motion detectors.

BACKGROUND OF THE INVENTION

Field of Invention

The present invention relates to a camera security system, and more particular to a network security camera that is fully equipped with an inbuilt motion and smoke detector and with a special remote control for operating the camera. Furthermore, the camera is specially designed to be set by a user to automatically capture any emergency or condition such as motion or smoke signal detected by any of the said inbuilt detectors and then the camera automatically sends a real-time picture or video of the emergency or condition along with a written text message automatically placed at the top, bottom, side, or middle of the picture. The text message states the exact emergency or condition which can be caused by smoke or fire or motion or movement or intrusion and also the address of the emergency or condition and this said information is sent by the camera to one or more programmed or preset wireless cellular telephone or mobile phone in which the telecommunication number was preset by the user and that can receive the picture and the text message by means of any available cellular telecommunication network, the real-time picture sent by the camera can be a still picture or a ten seconds or more seconds of motion picture or video is sent by the camera to the receiving wireless cellular telephone or mobile phone and a sensitive microphone in the camera detects audio signal in the area where the camera is mounted, the audio signal is equally sent along with the real-time motion picture, and the said information sent by the camera, the picture with text or ten or more seconds of motion video or picture can be viewed by the user of the alerted mobile phone immediately the message is received by the mobile phone or at any time preferred by the user or the alerted party, this is because any message sent by the camera is automatically stored in the text inbox of the alerted mobile phone and can be viewed by the user immediately the message is received or at any time preferred by the user.

SUMMARY OF THE INVENTION

The present invention is more particular to a network security camera that has an inbuilt smoke and motion detector and that has the ability to automatically send a picture or pictures or a ten or more seconds of motion picture or video message of an emergency or condition with a text message stating the exact location or address of the emergency or condition along with any sound or audio signal detected in the area where the camera is mounted is also automatically sent out by the camera to the text inbox of a receiving mobile phone by means of one or more available telecommunication networks. The picture and the text message are sent out at the same time to any preset cellular telephone number. The camera also comes with an external remote control.

The remote control is specially designed to be used for operating the camera. The remote control acts as a transceiver by sending and receiving data (program) to and from the camera. The camera is programmed originally by the manufacturer to disclose emergency or conditions, for example, fire or intrusion or movement through a text message alert stating the emergency or condition which can be fire or intrusion or movement inserted at the top, bottom, or side, of any emergency or condition picture or video sent to the receiving mobile phone, while the remote control is specially designed for the user for operating or programing the camera and for entering the address or location where the camera will be installed around the premises. Example of areas of installation around the premises are: on a door, on a desk, on a wall, on a pole stand around the premises. When any emergency or condition is detected by any of the detectors in the camera, picture(s) or video(s) is (are) automatically sent. The camera can be set to sound an alarm to a person or to an intruder as the exact picture of the emergency or condition and a text message alert stating the emergency or condition is automatically sent by the camera to any preset mobile phone in which the telecommunication number has been set by the user.

The text message sent automatically along with the still picture or motion picture by the camera to any preferred mobile phone can be a still text message automatically inserted or attached or placed below or at the top of the picture. In the case of a motion picture, a moving text message that moves across the video repeatedly at the top or button of the video. The user using the remote control originally entered the text showing the location of the camera, and the programmed or set cellular telephone number can be any preferred emergency responding party, for example, the police cellular telephone number, fire service cellular telephone number, security officer cellular telephone number, or any other emergency responding party cellular telephone number. The user can also program or set the user's cellular telephone number for self-automatic emergency or condition picture with text message alert sent automatically by the camera by means of any available cellular telecommunication network. One or more telecommunication companies can serve as the automatic picture and text alerting camera service provider because the camera works by connecting to one or more cellular telecommunication network.

The address or location of the camera is entered by the user using some set of buttons in the remote control can be erased and a new address or location of the camera can be entered or keyed in by the user. This is in case the user decides to change the location of the camera.

The camera also has an inbuilt alarm that can be set to sound when emergency or condition is detected by any of the inbuilt detectors. The inbuilt alarm in the camera is an alarm speaker. The alarm speaker can also be set to sound only when smoke or fire is detected. It can also be put off completely. The alarm speaker can also be set to sound voice communications or voice alarm when the remote control buttons are used for operating the camera, acting as an activity indicator. All these operations can be set by the user using the remote control.

The remote control has some set of buttons labeled 0 to 9. They are used for entering cellular telephone number and they are also used for entering the address or location of the camera. Another function of the 0 to 9 buttons is for password entering. The remote control also has a power on/off button, a select button, a shift space bar button, and an enter button, with the use of this set of buttons, the camera can be programmed by the user to function in the operation described in this invention.

The remote control displays some programs downloaded by a microcontroller in the remote control, the microcontroller downloads the programs from the camera, and the programs are displayed on a liquid crystal display in the remote control. Here is a list illustrating the programs; (1) Enter camera location or address, (2) Set intruder alert, (3) Set fire alert, (4) Enter numbers of alerts you want, (5) Set activation or deactivation menu, (6) Alarm on/off menu, (7) Password change menu, (8) Smart sitting mode, utilizing the key in buttons in the remote control and the program select button, the enter button, and the shift button. The security camera can be programmed by the user to function in the operation described in this invention.

For more understanding of the nature and objective of the present invention, reference should be made to the following FIGS showing the accompanying drawings.

BRIEF DESCRIPTION OF THE DRAWINGS

FIG. 1 to FIG. 11 show the embodiment of the security camera 1 and of the remote control 9 and the program generated by the security camera 1 as downloaded by the remote control 9 and the method of programing and operating the security camera 1 with the use of the remote control 9 to automatically send picture or pictures of an emergency or condition with text message or ten or more seconds of motion video with text message and audio automatically sent by the security camera 1 to any mobile phone 14 that can receive the picture and the text message.

FIG. 13 show the electronic block diagram of the automatic picture and text-alerting camera 1.

DETAILED DESCRIPTION OF THE PREFERRED EMBODIMENT

Figure 4:
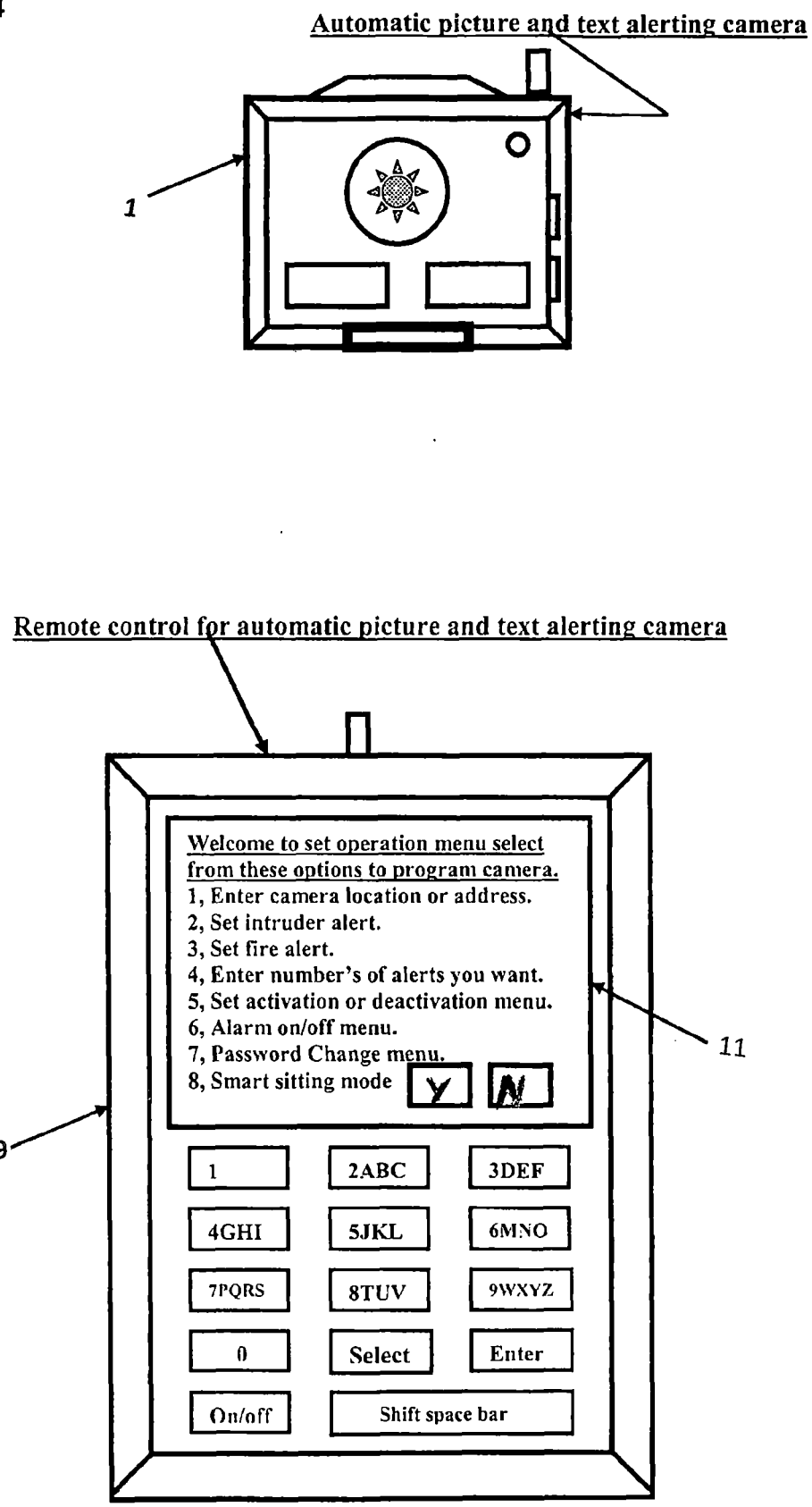

FIG. 1 show the embodiment of the automatic picture and text alerting camera 1, the camera 1 is a desktop or wall mounted camera 1 with an inbuilt smoke detector 2 and an inbuilt motion detector 3. The camera 1 comes as a wireless network camera 1, and includes a signal antenna 8. AC power supply or a battery can power the camera 1, here is the camera 1 AC cord 6.

FIG. 1 also show the embodiment of the remote control 9, the remote control 9 comes as a wireless remote control 9 with the following features, some set of key pads located in the lower region of the remote control 9 numbered 0 to 9. Also, the key pads or buttons are lettered from 2 to 9 and the letter A to Z, other buttons or key pads, also located in the lower region of the remote control 9 are: a select button, an enter button, and a shift space bar button, the remote control 9 also comes with an LCD 11 (liquid crystal display), the remote control 9 is powered by inserting a 9 volt battery in the battery compartment 10. The smoke detector 2 and the motion detector 3 in the camera 1 is designed to detect any outbreak of smoke or fire or intrusion or motion in the area where the camera 1 is installed and automatically activates an electronic circuit that is made up of one or more microprocessors and some other special electronic components like memory chips, transistors, diodes, capacitors, etc, are all assemble in the camera 1, all this said components work together to send the picture detected through a lens 5 in the camera 1 to any programmed wire/wireless cellular telephone or a mobile phone in which the cellular telecommunication number had been preset by the user to receive the said information automatically. The set of keypads labeled 0 to 9 and A to Z in the remote control 9 is used for entering cellular telephone number or alphabet, the key pads are also used for entering password for operating the camera 1. Furthermore, the key in buttons or key pads are used for entering alphabets. Example of the alphabets is the address or location where the camera 1 is installed, the key in button or key pads are touch tone pads or buttons, and the select button located in the lower region in the remote control 9 is used for selecting programs displayed on the liquid crystal display 11 in the embodiment of the remote control 9, a selected option is automatically highlighted and it is automatically stored or finally selected or entered with the use of the enter button or key pads.

The shift space bar button or keypad is used for making space between alphabets when the user enters alphabets or letters, for example, the address/location of the camera 1. All information selected and entered by the user using the remote control 9 is automatically sent to the camera 1 so that the camera 1 can store and operate according to the setting of the user, the remote control 9 can be set to operate or program the camera 1 wirelessly because the remote control 9 works as a transceiver and the remote control 9 can be made to work as a master remote control 9 because it can be made to operate or program one or more automatic pictures and text alerting camera 1.

The liquid crystal display 11 in the remote control 9 displays some program or menu in FIG. 1. This program or menu is used for operating and programming the camera 1 and it is elaborated from FIG. 1 to FIG. 11 and also in FIG. 14. FIG. 1 show the embodiment of the security camera 1, the security camera 1 comes with an inbuilt motion detector 3 and smoke detector 2 mounted in the housing of the security camera 1. Also in FIG. 1 shows the remote control 9, the remote control 9 displays some text instructions and some options named clear and ok in the liquid crystal display 11 on the remote control 9, the text is instructing the user on what to do as soon as the on/off button located at the lower end of the remote control 9 is activated to turn on the remote control 9, the liquid crystal display 11 in the remote control 9 displays set operation menu in this menu, the user is welcomed and instructed to enter password to continue set operation menu. The password is a four-digit password that is set by the user or the manufacturer of the security camera 1, if the wrong password is entered by the user using the key in buttons or keypads and the ok option is selected using the select and enter buttons, the remote control 9 will automatically displays the next program see FIG. 2.

FIG. 2 show the embodiment of the security camera 1 and the remote control 9 the liquid crystal display 11 in the remote control 9 displays another instruction in FIG. 2 telling the user sorry the password you have entered did not correspond to available data, please try again. This said data are the password or digit code encoded to unlock the operating menu downloaded by the remote control 9 from the security camera 1. When the user enters the right password and the ok option displayed on the liquid crystal display 11 is selected using the select and enter buttons the remote control 9 will automatically displays the next program see FIG. 3.

FIG. 3 show the embodiment of the security camera 1 and the remote control 9 the liquid crystal display 11 in the remote control 9 displays another instruction in FIG. 3 telling the user thank you, remote control 9 is downloading set operation menu from the automatic picture and text alerting camera please wait, and two dark bars will appear in the liquid crystal display 11, when the two dark bars become equal the remote control 9 will automatically displays the next program see FIG. 4, it only take a few seconds for the two dark bars to become equal indicating a complete download of the operation menu from the security camera 1 to the remote control 9.

FIG. 4 show the embodiment of the security camera 1 and the remote control 9 the liquid crystal display 11 in the remote control 9 displays another instruction in FIG. 4 telling the user welcome to set operation menu select from these options to program camera 1, in this menu a list of option is displayed on the liquid crystal display 11 in the remote control 9 and the user is instructed to select from the option or programs listed, here is a list illustrating the programs displayed on the liquid crystal display 11 in FIG. 4: (1) Enter camera location or address, (2) Set intruder alert, (3) Set fire alert, (4) Enter numbers of alerts you want, (5) Set activation or deactivation menu, (6) Alarm on/off menu, (7) Password change menu, (8) Smart sitting mode. These options or programs are selected by the user to set or program the security camera 1 by using the select and enter button in the remote control 9. The remote control works as a transceiver by sending and receiving information to and from the security camera 1. These programs and options are further described one after another from FIG. 5 to FIG. 11.

FIG. 5 show the embodiment of the security camera 1 and the remote control 9. The liquid crystal display 11 in the remote control 9 displays another instruction in FIG. 5 and it is the internal view of the menu or program number one (1), the instruction in program number one (1) tells the user to enter the security camera 1 location or address, and using the key in buttons or key pads labeled A to Z and with the use of the select and the enter buttons the user can enter the exact location where the security camera 1 will be installed which can be the user's home address, office, or room, and with the shift space bar button located in the lower region of the remote control 9, the user can space or shift letters or alphabets entered in order for the letters to make sense to a reader. After the user has finished entering the location or address of the security camera 1, the user should select store in order for the remote control 9 to send the location or address to the security camera 1 for storage, if the user decides to change the location of the security camera 1 at any time, the user can select clear from the option displayed on the liquid crystal 11 and re-enter a new location or address using the key pads in the remote control 9, and the address or location of the security camera 1 entered by the user is displayed on the liquid crystal display 11 before it is sent to the security camera 1 for storage. An arrow indicating left is also displayed in the liquid crystal display 11 in the remote control 9, the arrow can be selected and entered by the user if the user decides to go back to the programs listed in FIG. 4, using the select and enter buttons in the remote control 9 the user can select the arrow if the user decides to go back to the programs listed in FIG. 4, the user must go back to the programs listed in FIG. 4 in order to select another option to set or program the security camera 1.

FIG. 6 show the embodiment of the security camera 1 and the remote control 9. The liquid crystal display 11 in the remote control 9 displays another instruction in FIG. 6 and it is the internal view of the menu or program number two (2), the menu or program displayed says set intruder alert menu, and also a text instruction is displayed in program number two (2), the liquid crystal display 11 displays text instruction telling the user to enter the user's cell telephone number or any other preferred cellular telephone number for automatic emergency picture and text alert, the user can enter the user's mobile phone number or any other preferred party, for example the police or any other party to which the user wants the automatic picture and text alerting camera 1 to send the picture of intrusion with text message or ten or more seconds of motion picture(s) with text message stating the address or location of the security camera 1 when emergency or condition is detected by the motion detector in the security camera 1, this only happens when the security camera 1 is set by the user to alert, for example, by sending the picture with the text stating the address or location of the security camera 1 which is also the address or location of the emergency or condition.

FIG. 6 also show example of any wireless cellular telephone or mobile phone 14 that can receive the picture with text and how the picture of the intruder with the text message stating the location or address of the emergency or condition is automatically sent by the security camera 1 to the receiving mobile phone 14 when motion is detected. Apart from the text stating the emergency or condition and the alphabets stating the exact location of the emergency or condition, some numbers are automatically displayed along with the picture and the text, this is called the provider and user code or number, and every user is given the provider and user code or number by the provider, for example, the provider and user code are displayed as 88144700 in the alerted mobile phone 14, the code is used by any alerted party like the police or fire service to identify the user and the security camera 1, all the police or the fire service need to do is to send the provider's and user's code to the provider and the provider will use the provider and user code or number to fish out or identify the security camera 1, the provider code appears when the security camera 1 is set to alert a mobile phone 14, or when fire or intrusion is detected by the motion detector 3 or the smoke detect 2 in the security camera 1. Another way the security camera 1 can be identified by the party can be in form of caller ID or network number just like a telephone number that can equally be sent by the security camera 1 to the alerted mobile phone 14.

Furthermore FIG. 6 also show the security camera 1 and an insertable provider's network chip 13 that automatically allows the security camera 1 to operate by connecting to one or more desired cellular telecommunication networks or providers. An arrow indicating left is also displayed in the liquid crystal display 11 in the remote control 9, the arrow can be selected and entered by the user if the user decides to go back to a previous menu, using the select and enter buttons in the remote control 9 the user can select the arrow if the user decides to go back to a previous programs or menu in FIG. 4, the user must go back to the programs listed in FIG. 4 in order to select other options in the menu to set or program the security camera 1.

Figure 7:
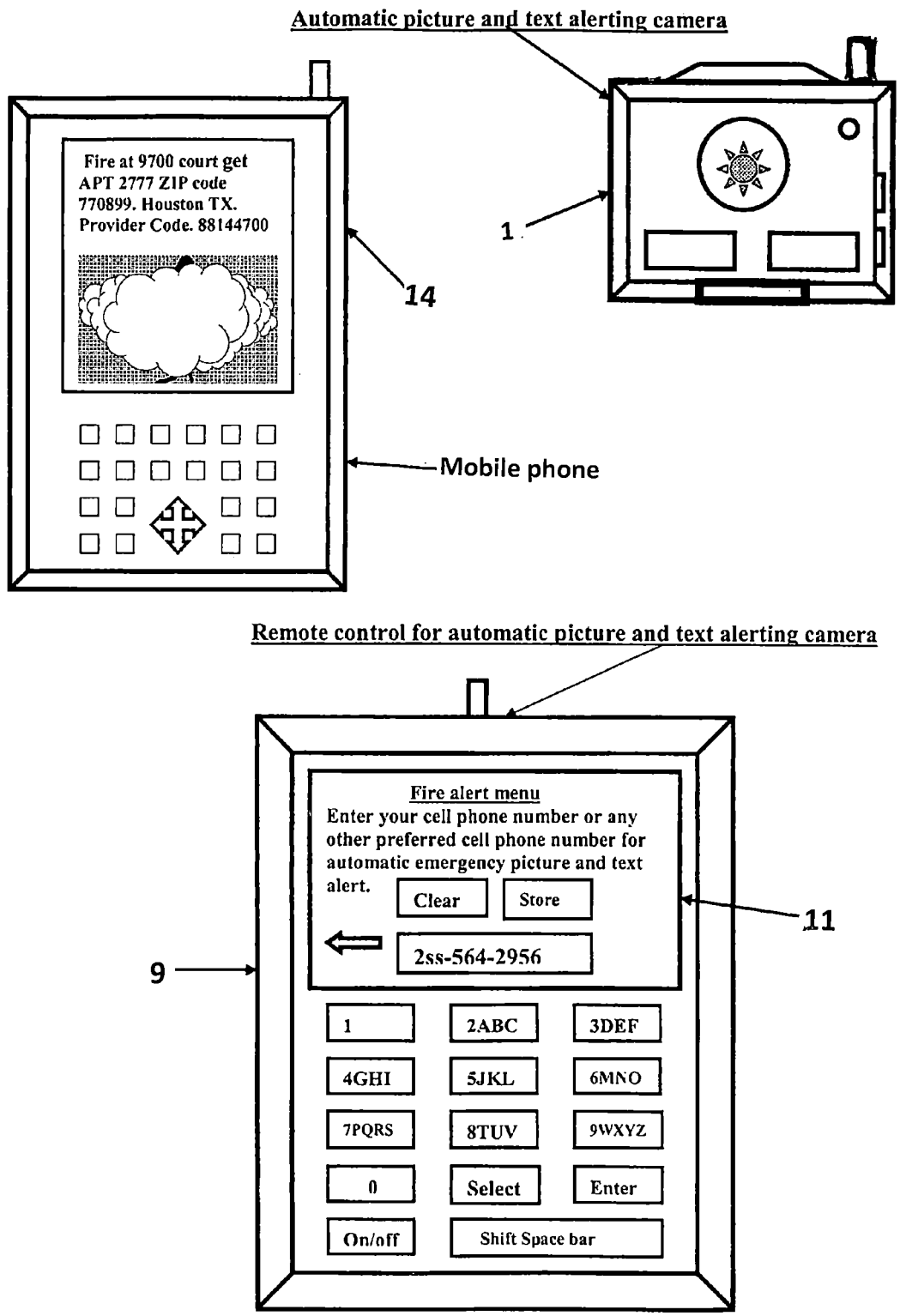

FIG. 7 show the embodiment of the security camera 1 and the remote control 9. The liquid crystal display 11 in the remote control 9 displays another instruction in FIG. 7 and it is the internal view of the menu or program number three (3), the menu or program displayed a text information that say fire alert menu, also an instruction is displayed in program number three (3) telling the user to enter the user's cellular telephone number or any other preferred cellular telephone number for automatic emergency or condition picture and text alert, the user can enter the user's cellular telephone number or the telephone number of another party, for example, the fire service or any other party to which the user wants the automatic picture and text alerting camera to send picture of an outbreak of fire with the text message showing the address or location of the security camera when an emergency or condition is detected by the smoke detector 2 in the security camera 1, this only happens when the security camera 1 is set by the user to alert by sending the picture with the text stating the emergency and the address or the location of the security camera 1 which is also the address of the emergency or condition. FIG. 7 shows an example of any wireless cellular telephone or mobile phone 14 that can receive the picture and text, and how the picture of the fire and the text message telling the location or address of the emergency or condition sent by the security camera 1 may appear in the mobile phone 14. An arrow indicating left is also displayed in the liquid crystal display 11 in the remote control 9, the arrow can be selected by the user if the user decides to go back to a previous menu, using the select and enter button in the remote control 9, and the user can select the arrow, if the user decides to go back to the listed menu, the user must go back to the listed menu in order to select other options or to set or program the security camera 1.

FIG. 8 show the embodiment of the security camera 1 and the remote control 9. The liquid crystal display 11 in the remote control 9 displays another instruction in FIG. 8 and it is the internal view of the menu or program number four (4), the menu or program displayed, says enter numbers of alerts you want, in this menu the user is instructed to select and enter the numbers of alerts the user wants from the listed options, with the use of the select and enter button the user can select the number of times the user wants the automatic picture and text alerting camera 1 to send picture with text when any emergency or condition is detected by any of the detectors, some numbers are displayed in the liquid crystal display 11 in the remote control 9 and they are 1, 2, 3, 5, 10, a selected number is automatically highlighted and the user should select ok using the select and the enter button in order to set or store the number of alerts selected, if the user wants unlimited alert the user can contact the provider because the security camera 1 can also be set by the provider with the use of a special computer at the provider station to alert any number of times or unlimitedly.

Furthermore in this menu the user using the remote control 9 can set the security camera 1 to capture and send a still picture with text message by selecting the still option or a motion picture with text message and with any audio signal detected by the sensitive microphone 7 in the security camera 1 by selecting the motion option, and the said message is sent to one or more preferred mobile phone the telecommunication number is set by the user when any of the said emergency or condition is detected by any of the said detectors. An arrow indicating left is also displayed in the liquid crystal display 11 in the remote control 9, the arrow can be selected and entered by the user, if the user decides to go back to the previous menu listing on FIG. 4, by using the select and enter button in the remote control 9 the user can select the arrow, if the user decides to go back to the programs listed in FIG. 4, the user must go back to the programs listed in FIG. 4 in order to select another options to set or program the security camera 1.

FIG. 9 show the embodiment of the security camera 1 and the remote control 9. The liquid crystal display 11 in the remote control 9 displays another instruction in FIG. 9 and it is the internal view of the menu or program number five (5), the menu or program displayed is set to activation or deactivation menu, in this menu the user is instructed to select from the listed options to activate or deactivate the security camera 1 alerting mode, with this menu the user can activate or deactivate the security camera 1 alerting mode when exiting or entering the premises where the security camera 1 is mounted or located, with the use of the select and enter button, the user can select from the options displayed in the liquid crystal display 11 and enter to apply a particular option, the ok option is selected and entered with the use of the select and enter button in the remote control 9. The activate option, if selected by the user, enables the security camera 1 to send picture and text to any programmed cellular telephone number entered by the user while the deactivate option disables the security camera 1 from sending picture with text when any of the detectors in the security camera 1 detects any emergency or condition in the premises where the security camera 1 is located.

In FIG. 4 there are two text boxes indicating Y and N meaning yes and no, these indicated options are for the smart sitting mode, if the yes option is selected by the user, the user will not need to go through the activation or deactivation menu to activate or deactivate the security camera 1, all the user needs to do is to enter the user's previously selected password, and then press enter to activate or shift space bar to deactivate the security camera 1, thus the remote control is smart and easy to use. When the no option in the menu is selected, the user will have to go through the set activation or deactivation menu in FIG. 8, when activating or deactivating the security camera 1.

FIG. 10 show the embodiment of the security camera 1 and of the remote control 9. The liquid crystal display 11 in the remote control 9 displays another instruction in FIG. 10 and it is the internal view of the menu or program number six (6), the menu or program displayed is the alarm on/off menu, in this menu the user is instructed to select from the listed options to put on or off the security camera 1 alarm mode. The alarm 4 on the embodiment of the security camera 1 is an alarm speaker 4, with this menu, the user can set the alarm speaker 4 in the security camera 1 to sound an alarm or to not sound an alarm when any emergency or condition is detected by any of the detectors, selecting from the options in condition 1, condition 2 enables the alarm speaker 4 to sound or not to sound when the security camera 1 is set or not set to send picture and text. The options in condition 1 and 2 can be placed on or off and are selected by the user by using the select button in the remote control 9 and the selected options is applied by the user by selecting ok. An arrow indicating left is also displayed in the liquid crystal display 11 in the remote control 9, the arrow can be selected and entered by the user if the user decides to go back to the previous menu, using the select and enter buttons on the remote control 9, the user can select the arrow, if the user decides to go back to previous programs or menu, the user must go back to the programs or menu displayed in FIG. 4 in order to select another option to set or program the security camera 1.

FIG. 11 show the embodiment of the security camera 1 and of the remote control 9. The liquid crystal display 11 in the remote control 9 displays another instruction in FIG. 11 and it is the internal view of the menu or program number seven (7), the menu or program displayed password change option, in the menu the user is instructed to enter four-digit number, then select ok to apply as your new password, or select clear to cancel a wrong entry, the user only makes use of this menu if the user decides to create a new password for operating the security camera 1. When the user has finished entering any four-digit password the user should select ok to apply the new password as operation menu password, if the user decides to cancel entering, the user can select clear to delete or cancel a wrong entering. The smart sitting mode which is the program number eight (8) allows the user to activate or deactivate the security camera 1 easily and quickly see FIG. 4. All options and settings selected and entered in the remote control 9 is automatically sent to the security camera 1 by the remote control 9, the remote control 9 is a wireless electromagnetic remote control 9 and works within 100 meters or more around the region where the security camera 1 is located.

Figure 12:
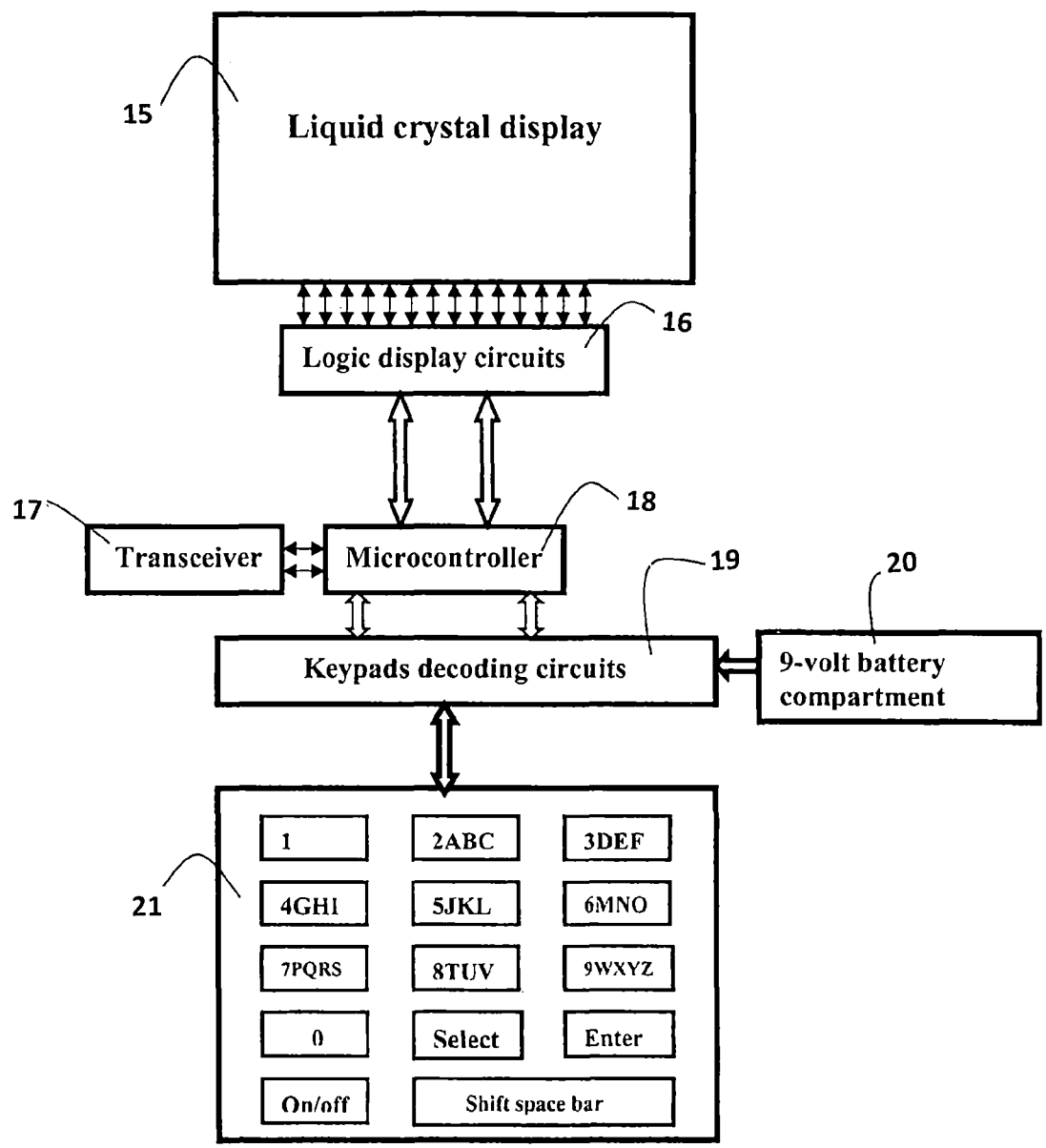
FIG. 12 show the electronic block diagram of the remote control 9.

FIG. 12 is the electronic block diagram of the remote control 9. Here are the keypads 21 the keypads is linked to the keypads decoding circuits 19, the keypads decoding circuits 19 function to detect any number or alphabet entered by the user using the keypads 21, the keypads decoding circuit 19 is made up of one or more logic gates or integrated circuits. The keypads decoding circuits 19 are connected to a microcontroller 18, the microcontroller 18 functions in controlling the logic display circuits 16 and the transceiver 17. The logic display circuit 16 functions in decoding any program or number or text generated or downloaded by the microcontroller 18.

The microcontroller 18 also downloads and sends data to and from the automatic picture and text alerting camera 1 by connecting to the transceiver 17, information generated and downloaded by the microcontroller 18 is displayed on the liquid crystal display by the help of the logic display circuit 16, these electronic circuits function together to make the remote control 9 to work, the remote control 9 starts to function when a 9-volt battery is connected to the battery compartment 20 in the remote control 9.

FIG. 13 is the electronic block diagram of the security camera 1 here are the smoke detector 2 and the motion detector 3 in the security camera 1. The transceiver 29 plays an important role by sending and receiving data to and from the remote control 9. The address or location of the security camera 1, entered by the user using the keypads in the remote control 9, is received by the transceiver 29, and it is processed by the microprocessor 28 and stored by the memory 26. When any emergency or condition is detected by the smoke detector 2 or the motion detector 3 the network connecting circuit will automatically be triggered by the microprocessor 28, and at the same time the microprocessor 28 also triggers the picture detecting circuit 24, and the picture detecting circuit 24 automatically processes any picture captured by the lens 5 in the security camera 1.

The picture detecting circuit 24 also starts preparing the picture or ten or more seconds of motion picture to be sent to one or more cellular telephone or mobile programmed by the user using the remote control 9. Moreover, at the same time, the picture detecting circuit 24 is preparing to send the picture; the text regenerating circuit automatically start generating the address or location of the security camera 1 stored in memory 26. The address or location entered by the user using the remote control 9 and the text telling the location or address is retrieved from the memory 26 by the text regenerating circuit, additional information not entered by the user is also retrieved from the memory 26 by the text regenerating circuit stating the emergency or condition according to the emergency or condition that is detected. The picture and the text messages are automatically sent to the picture and text merging circuit 23, the picture and the text will be attached as the text will be automatically inserted into the picture by the picture and text merging circuit 23 and both the text and the picture will be attached or inserted together and sent to the network connecting circuit and then will be sent out automatically by the network connecting circuit through the picture, text and audio sending circuit 22. In addition, the network connecting circuit will automatically send out the picture with the text by means of any available cellular telecommunication network, to be received by any programmed mobile phone that can receive the emergency or condition picture with the text message and any audio signal detected by a sensitive microphone 7 that is connected to the audio circuit symbol 23, all these functions occurs very fast, see FIG. 1 for the sensitive microphone 7 on the embodiment of security camera 1.

FIG. 12 show an insertable provider network chip 13 and the insertable chip 33, the insertable provider chip 13, when inserted into the security camera 1 by the user or the provider allows the security camera 1 to work by connecting automatically to any preferred cellular telephone network or provider of the user's choice and the insertable provider chip 33, when inserted in the security camera 1 by the user or provider, allows the user to remotely access and communicate with the security camera 1 and to request for information like motion picture with audio or still picture(s) from the security camera 1 by paging or communicating with the security camera 1 using the provider and user code dialed directly into any mobile phone that is connected to a cellular telecommunication network, after the user has finished paging the security camera 1 the user must hang up so that the security camera 1 will automatically send back the request or the said information to the user through the same mobile phone or any other mobile phone preferred by the user, the said request is granted by the security camera 1 when the security camera 1 is in activated or deactivated alerting mode. The user or the provider will insert chip 13 and chip 33 into the socket 31 for chip 13 and to socket 32 for chip 33, socket 31 and 32 are shown on the electronic block diagram of the security camera 1 see FIG. 13. FIG. 13 also show the audio circuit symbol 25 on the block diagram of the security camera 1 and also the alarm circuit 30 on the block diagram of the security camera 1, the alarm circuit 30 can be made to sound one or more alarm tones when emergency or condition is detected by any of the detectors 2 or 3 or when the remote control 9 is being used to operate or program the security camera 1 see FIG. 1 to FIG. 11, the alarm circuit 30 can also be built to sound voice alarm. The alarm circuits 30 will be built with audio amplifier that comprises of transistors, capacitors, integrated circuits, alarm speaker 4 see FIG. 1 for the alarm speaker 4, many other electronics components will be configured into the alarm circuit 30 in the security camera 1. The security camera 1 will be built with surface mount or through hole integrated circuits and other special components such as resistors, transistors, light emitting, diodes, capacitors, diodes, etc.

The security camera 1 start working when the AC power circuit 27 is connected to AC power by connecting the AC power cord 6 to an AC power source see FIG. 1 for the AC power cord 6 or when a battery is connected or inserted into the security camera 1. The security camera 1 can also be powered by a solar cell. The security camera 1 can be an infrared camera for night vision or a visible light camera. The security camera 1 comes as a bulky or a cellular security camera and the motion or still picture sent by the security camera 1 is in color. The remote control 9 can be a cellular or a bulky remote control and also the remote control 9 can be a wall mounted remote control 9 or a mobile remote control 9.

Figure 14:
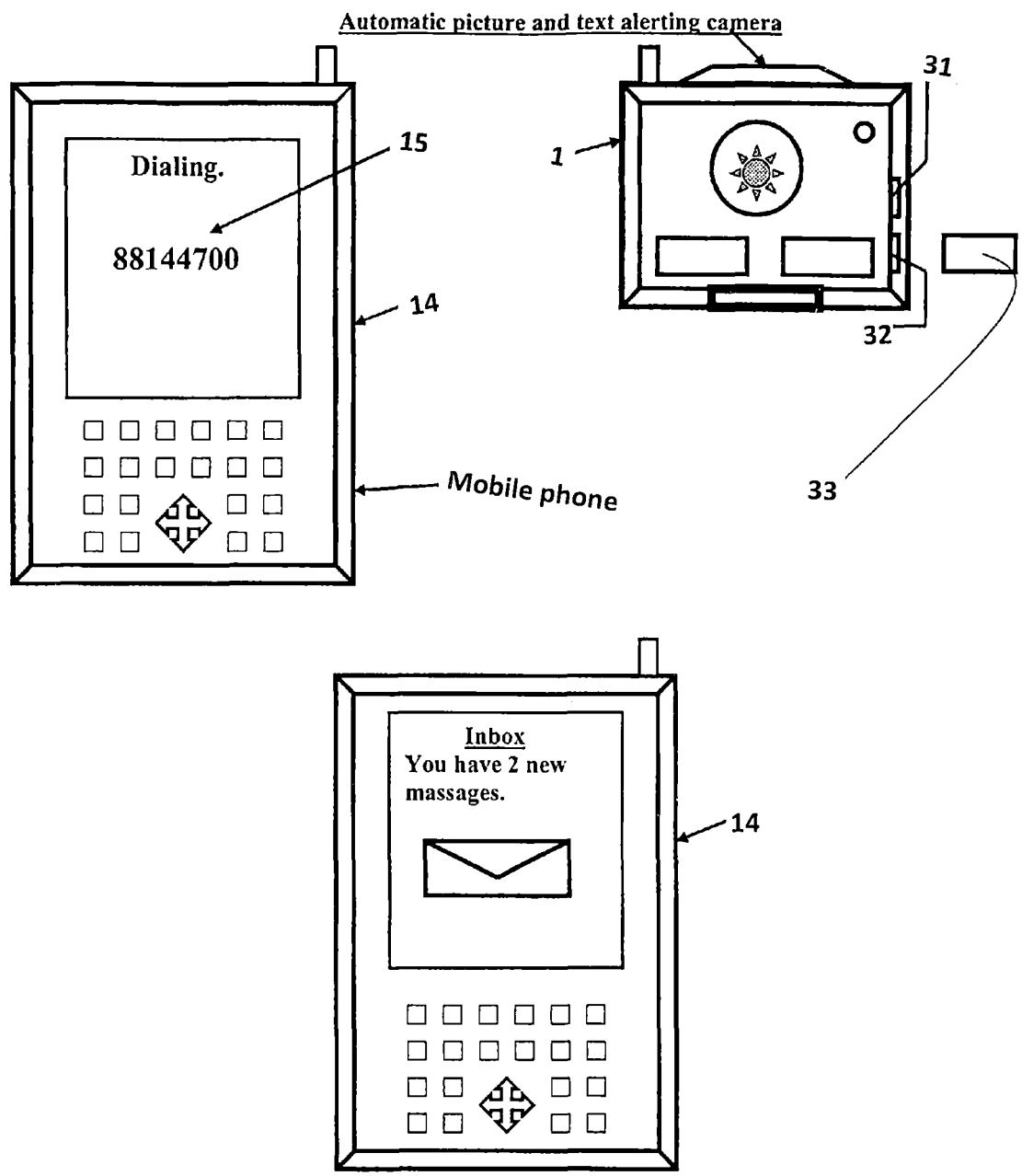
FIG. 14 show how to use a mobile phone 14 to page or communicate with the security camera 1.

FIG. 14 show how to page or communicate with the security camera 1 by using a mobile phone 14 to page the security camera 1 the user must dial in the provider and user's code using a mobile phone that is connected to a cellular telecommunication network.

The security camera 1 works by connecting to one or more networks, for example, an internet network or any other special network can be used to page or access the security camera 1 as shown by FIG. 14, another example of the provider and user's codes are indicated as PUC31 dialed in the mobile phone display 15 by the user and when a network connection is linked between the security camera 1 and the mobile phone 14 there will be an audio sound or a tone to indicate that, the user must then enter the telecommunication number of a receiving wireless cellular telephone or a mobile phone 14 to which the user wants the security camera 1 to send back the request, and then the user must hang up the call to receive the incoming request automatically from the security camera 1 as shown by the mobile phone in FIG. 14 and the request is granted by the security camera 1 based on the setting of the user in FIG. 4 and also the request is granted by the security camera 1 when the security camera 1 is in activated or deactivated alerting mode. Further features about the security camera 1 and the remote control 9 are analyzed from FIG. 1 through FIG. 14.

The invention claimed is:
1. A security system, comprising:
a security camera having:
  a housing having an inner cavity, wherein a smoke detector and a motion detector are positioned within the cavity of the housing, and
  a chip inserted by a user, wherein the chip enables the security camera to connect and communicate over a cellular network;
a wireless external remote control associated with the security camera and configured to:
  program the security camera to automatically capture and send a still picture or motion picture to a remote computer, wherein the remote computer is a receiving mobile phone,
  program the security camera to store a telephone number of the receiving mobile phone, and
  program the security camera to specify an amount of alerts the security camera sends to the receiving mobile phone when any of the smoke detector or motion detector is activated related to an emergency in an area proximate to the security camera; and
wherein the still picture or motion picture includes text which indicates a location of the emergency, which is automatically inserted into the still picture or motion picture;
wherein the still picture or motion picture provides sound or audio signal detected in the area;
wherein the still picture or motion picture includes a provider and user code;
wherein the still picture or motion picture with text and audio of the emergency are automatically sent out together by the security camera through the cellular network as an alert in the form of a text message to a text message inbox of the receiving mobile phone, and via the stored telephone number, when any of the smoke detector or motion detector is activated,
wherein the sent text messages do not exceed the specified amount of alerts related to the emergency, and
wherein the receiving mobile phone identifies the security camera via caller ID or provider and user code.

* * * * *